(12) United States Patent
Lanzarini et al.

(10) Patent No.: US 7,360,347 B2
(45) Date of Patent: Apr. 22, 2008

(54) METHOD AND DEVICE FOR WRAPPING ARTICLES

(75) Inventors: Luca Lanzarini, Crespellano (IT); Francesco Milandri, Cesena (IT); Luca Federici, Bologna (IT); Stefano Negrini, Calderara di Reno (IT)

(73) Assignee: G.D Societá per Azioni (IT)

( * ) Notice: Subject to any disclaimer, the term of this patent is extended or adjusted under 35 U.S.C. 154(b) by 0 days.

(21) Appl. No.: 11/458,238

(22) Filed: Jul. 18, 2006

(65) Prior Publication Data

US 2007/0028567 A1 Feb. 8, 2007

(30) Foreign Application Priority Data

Jul. 19, 2005 (IT) .......................... BO2005A0480

(51) Int. Cl.
*B65B 51/14* (2006.01)
*B65B 11/28* (2006.01)

(52) U.S. Cl. ............................ 53/463; 53/466; 53/477; 53/234; 53/374.6

(58) Field of Classification Search ................... 53/463, 53/465, 466, 477, 225, 234, 374.3, 374.5, 53/374.6, 375.4, 376.7, 387.3
See application file for complete search history.

(56) References Cited

U.S. PATENT DOCUMENTS

| 4,362,593 | A | * | 12/1982 | Grevich ....................... 53/374.6 |
|---|---|---|---|---|
| 4,887,408 | A | | 12/1989 | Mattei et al. |
| 5,271,210 | A | * | 12/1993 | Tolson ......................... 53/374.5 |
| 5,475,964 | A | * | 12/1995 | Fiesser et al. .............. 53/374.6 |
| 5,930,976 | A | * | 8/1999 | Boldrini et al. ................ 53/234 |
| 6,219,999 | B1 | * | 4/2001 | Ghini et al. ................... 53/466 |
| 6,629,400 | B1 | * | 10/2003 | Offermann et al. ......... 53/374.6 |
| 6,662,527 | B1 | * | 12/2003 | Suga ........................... 53/374.6 |
| 6,907,716 | B2 | * | 6/2005 | Cinotti et al. ............... 53/374.6 |
| 7,131,246 | B2 | * | 11/2006 | Dall'Omo et al. .......... 53/376.7 |
| 2001/0008064 | A1 | * | 7/2001 | Todd et al. ................. 53/374.6 |
| 2004/0065055 | A1 | * | 4/2004 | Spatafora et al. .............. 53/463 |

FOREIGN PATENT DOCUMENTS

| EP | 0764595 | | 3/1997 |
|---|---|---|---|
| EP | 1066206 | | 10/2005 |
| GB | 1054644 | * | 1/1967 |
| WO | WO 02/49918 | | 6/2002 |

* cited by examiner

*Primary Examiner*—Stephen F. Gerrity
(74) *Attorney, Agent, or Firm*—Ostrolenk, Faber, Gerb & Soffen, LLP

(57) ABSTRACT

A device for wrapping packets of cigarettes has a conveyor for feeding the packets successively along a path; and a number of heating heads, each of which is brought into contact with a respective packet and accompanies the packet from a contact station to a withdrawal station along part of the path; on reaching the withdrawal station, the heating heads are withdrawn, crosswise to the path, from the respective packets, and are conveyed, parallel to the path, from the withdrawal station to the contact station.

22 Claims, 5 Drawing Sheets

METHOD AND DEVICE FOR WRAPPING ARTICLES

The present invention relates to a method and device for wrapping articles.

The present invention may be used to advantage for packing cigarettes, to which the following description refers purely by way of example.

More specifically, the present invention relates to a device for wrapping tobacco products, and which comprises a folding unit for folding a sheet of wrapping material about a respective article to form a wrapping having two superimposed portions; and a first conveyor for feeding the wrapping in a first direction along a first path. The device also comprises a heating head for joining, by transferring heat to, the two said portions; and a second conveyor for feeding the heating head in the first direction, in phase and in contact with the wrapping and from a contact station to a withdrawal station, along a second path parallel to at least one portion of the first path.

BACKGROUND OF THE INVENTION

Known devices of the above type, such as the device described, for example, in Patent Application WO 0249918 A1, have the drawbacks of being relatively complex, expensive, and bulky, and requiring extremely precise maintenance involving considerable downtime.

Other known devices for wrapping articles comprise a wrapping wheel having a number of peripheral seats, each of which, at each operating cycle, transfers a respective group of cigarettes and a respective sheet of wrapping material from an input station to an output station along a work branch of a substantially circular path, and returns to the input station along a return branch of the substantially circular path.

Devices of this sort comprise embodiments of a first type, in which a respective heating head is associated with each seat; and embodiments of a second type, in which a number of heating heads are located in substantially fixed positions along the work branch, as described, for example, in Patent U.S. Pat. No. 4,887,408.

Both types of embodiments have drawbacks.

Embodiments of the first type comprise a relatively large number of heating heads, which are not exploited along the return branch; and the devices are relatively expensive, and relatively complicated to service : a large number of heating heads must be simultaneously functional.

In embodiments of the second type, contact between the heating heads and the sheets of wrapping material is relatively short, so that the sheets of wrapping material are not always stabilized properly about the respective groups of cigarettes.

SUMMARY OF THE INVENTION

It is an object of the present invention to provide a method and device designed to at least partly eliminate the aforementioned drawbacks, and which at the same time are cheap and easy to implement.

According to the present invention, there are provided a method and device as claimed in the attached Claims.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
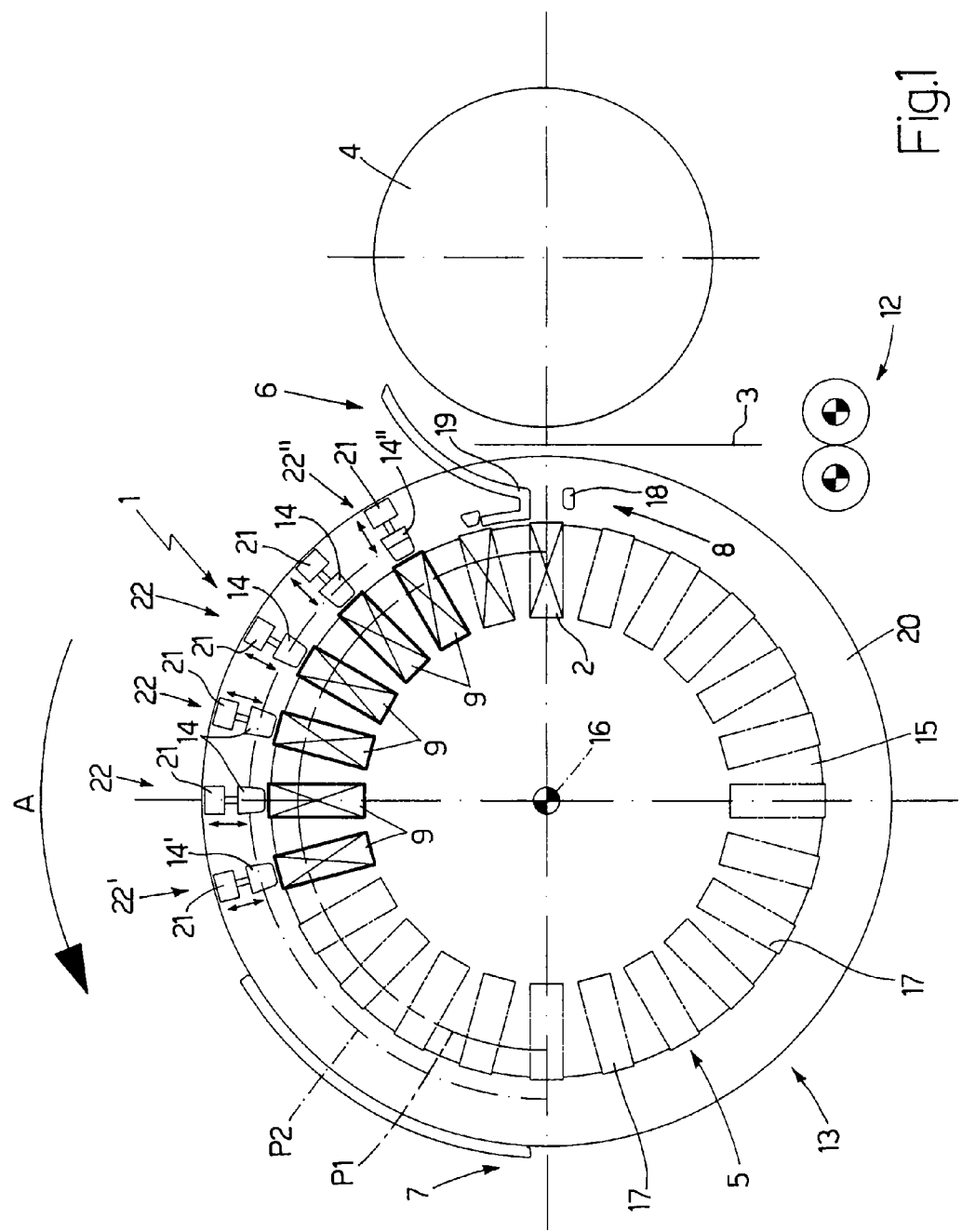
FIG. 1 shows a schematic side view, with parts removed for clarity, of a device in accordance with the present invention.
Figure 2:
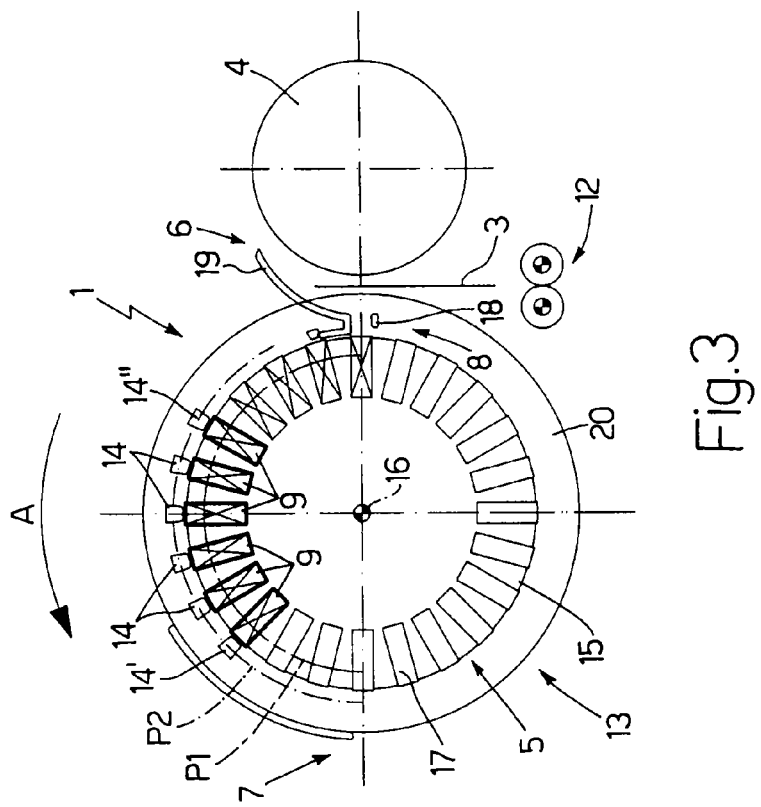
FIGS. 2 to 7 show a schematic side views, with parts removed for clarity, of the FIG. 1 device in different operating positions.
Figure 3:
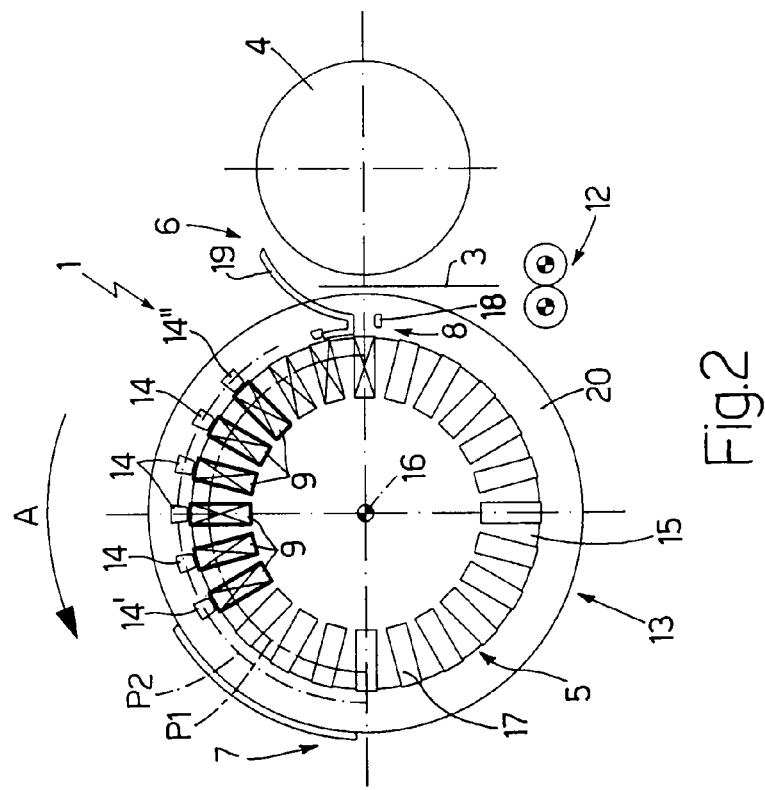
Figure 5:
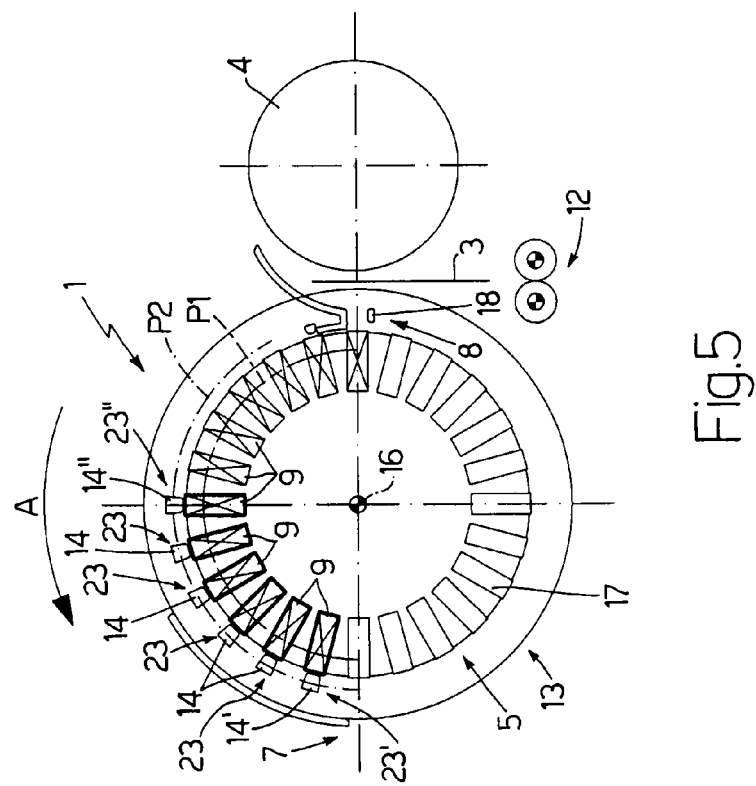
Figure 4:
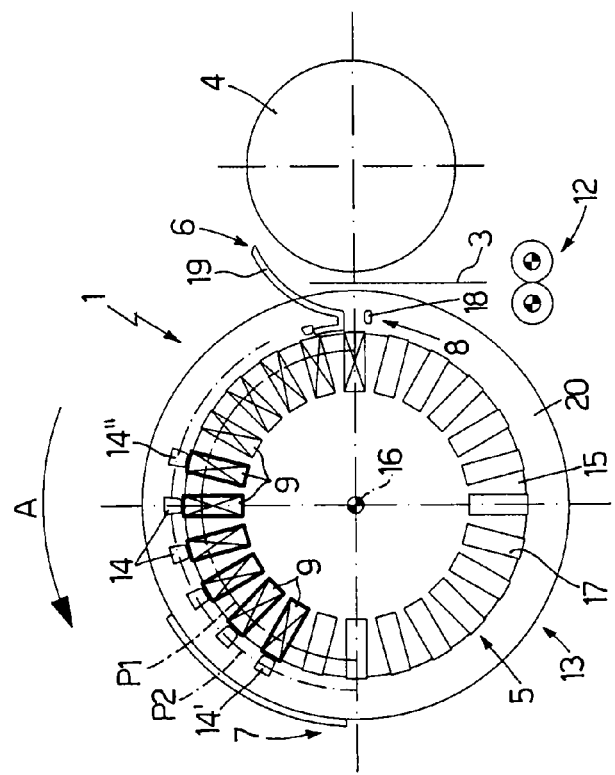
Figure 8:
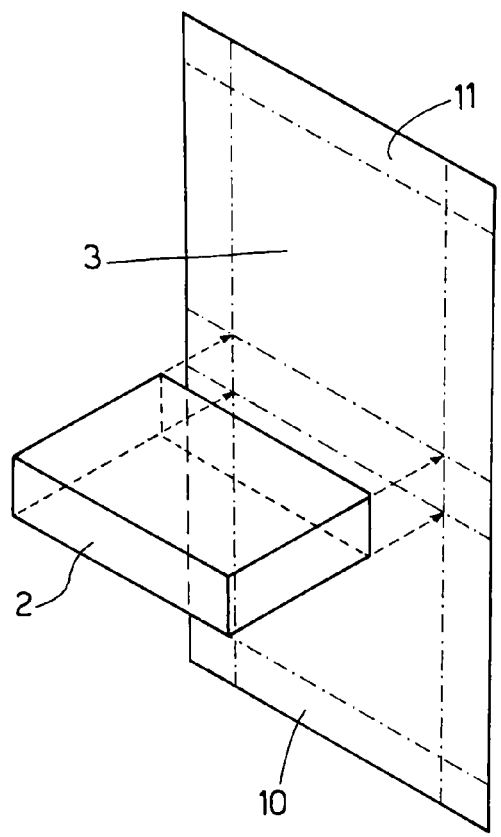
FIGS. 8 to 10 show steps in the wrapping of a packet of cigarettes by the FIG. 1 device.
Figure 9:
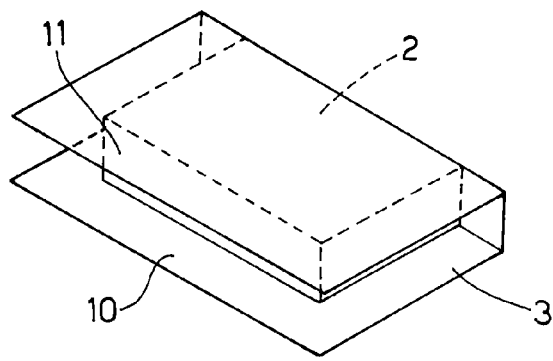
Figure 10:
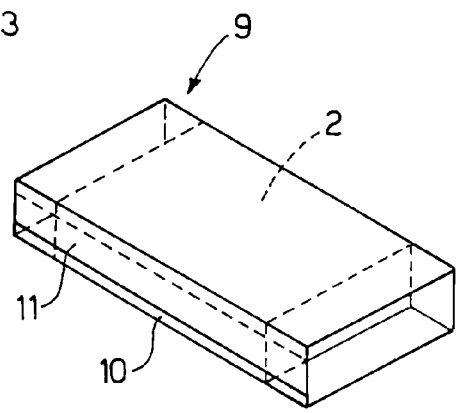

Number 1 in FIG. 1 indicates as a whole a device for wrapping hinged-lid packets 2 (shown schematically) of cigarettes (not shown) in sheets 3 of heat-seal wrapping material. Device 1 comprises a feed wheel 4 for feeding packets 2 one at a time to a conveyor 5, which feeds packets 2, in a direction A along a path P1, from an input station 6 to an output station 7; and a folding unit 8 for folding each sheet 3 of wrapping material about respective packet 2 to form a wrapping 9, in particular a tubular wrapping, having two superimposed portions 10 and 11 (FIGS. 8 to 10). Device 1 also comprises a feed unit 12 for supplying sheets 3 of wrapping material at input station 6; and a conveyor 13 for feeding heating heads 14 in direction A along a path P2, which extends parallel to a portion of first path P1, so that, at each operating cycle, each heating head 14 travels in phase and in contact with a respective wrapping 9. Each heating head 14 provides for sealing, by transferring heat to, the two portions 10 and 11 of respective wrapping 9.

Conveyor 5 comprises a wheel 15, which rotates about a respective axis 16 and, in turn, comprises a number of peripheral seats 17, each for housing a respective wrapping 9 at each operating cycle.

Folding unit 8 comprises a moving member 18 for folding portions 10 upwards; and a fixed contrast member 19, with which portions 11, as wheel 15 rotates, are brought into contact and folded downwards onto respective portions 10.

Conveyor 13 comprises a wheel 20, which rotates about axis 16 and is fitted integrally with a number of fluidic or any other type of actuators 21. Each actuator 21 supports a respective heating head 14, and moves respective heating head 14 crosswise to paths P1 and P2, in particular, radially with respect to axis 16.

It should be pointed out that heating heads 14 are arranged in a line, and are so spaced that, in use, adjacent heating heads 14 can contact adjacent wrappings 9.

In a further embodiment, not shown, conveyor 13 comprises one fluidic or any other type of actuator for moving a support—to which heating heads 14 are fitted integrally—crosswise to paths P1 and P2, in particular, radially with respect to axis 16.

Operation of device 1 will now be described as of the instant in which heating heads 14 are each located at a respective contact station 22.

At this point, each actuator 21 moves respective heating head 14 towards and into contact with relative wrapping 9 (FIG. 1).

Upon each heating head 14 contacting relative wrapping 9, wheels 15 and 20 rotate in steps in direction A until the leading heading head 14' in the line of heating heads 14 is positioned immediately upstream from output station 7 (FIGS. 2 to 5).

At this point, each heating head 14 is located at a respective withdrawal station 23, where each actuator 21 withdraws respective heating head 14 from relative wrapping 9.

Figure 7:
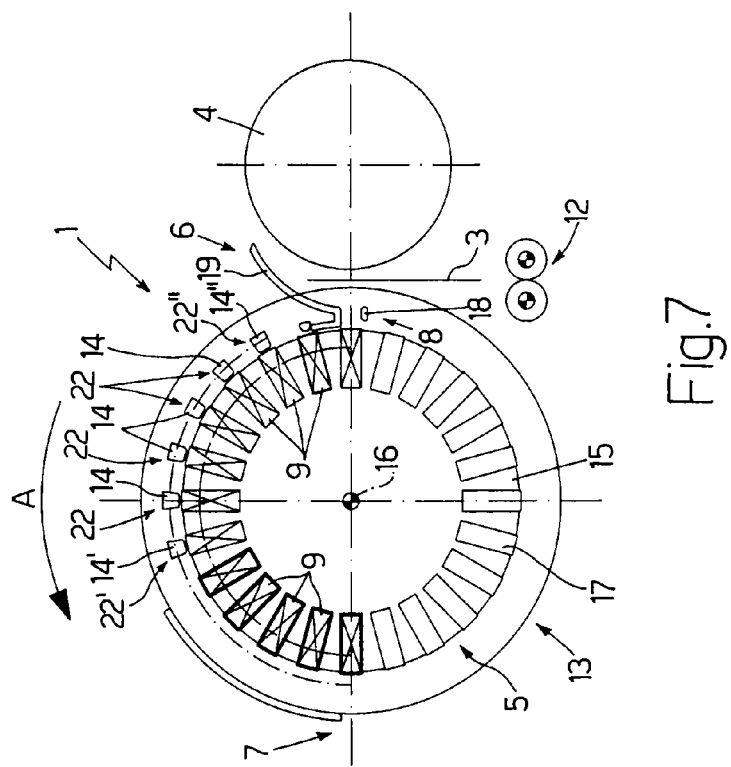
Figure 6:
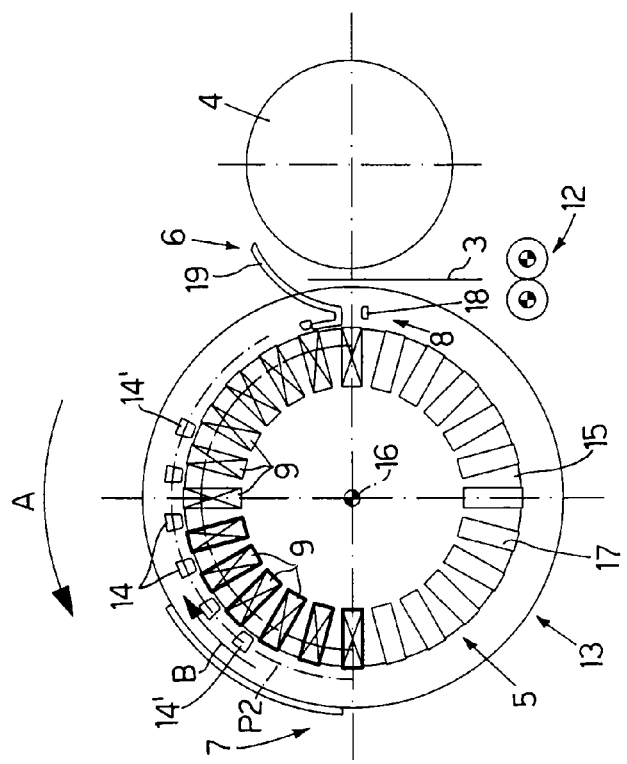

Once heating heads 14 are withdrawn from respective wrappings 9, wheel 20 is reversed to feed each heating head 14 continuously from respective withdrawal station 23 to respective contact station 22 along path P2 in a direction B opposite direction A (FIGS. 6 and 7)

It should be pointed out that the contact station 22' of the leading heating head 14' substantially coincides with or (in further embodiments) is located downstream from the withdrawal station 23" of the trailing heating head 14" in the line of heating heads 14. In the embodiment shown, contact station 22' is located immediately downstream from withdrawal station 23".

It should also be pointed out that wheel 20 conveys heating heads 14 in direction B at a second speed V2 greater than a first speed V1 at which wheel 20 conveys heating heads 14 in direction A.

More specifically, speeds V1 and V2 are related by the equation:

$$V2 \geq (n-m) \times V1$$

where V1 is the first speed; V2 is the second speed; n is the given number of heating heads 14; and m is a integer smaller than n. In the embodiment shown, n equals six, m equals four, and speeds V1 and V2 are related by the equation:

$$V2 \cong 2 \times V1$$

When n is greater than one, m preferably equals one; in which case, for device 1 to operate well, contact station 22' substantially coincides with withdrawal station 23".

The particular design and operation of device 1 provide for achieving top-quality sealing of portions 10 and 11, by maintaining relatively prolonged contact between each heating head 14 and relative wrapping 9. Furthermore, device 1 comprises a relatively small number of heating heads 14, which, in use, travel along short trajectories and are moved by a relatively straightforward, compact conveyor 13.

It should be pointed out that, though the embodiment shown comprises six heating heads 14, device 1 may even comprise only one heating head 14 and preferably at least two heating heads 14.

In further embodiments not shown, device 1 comprises folding and sealing members for folding and completely stabilizing sheets 3 of wrapping material about respective packets 2.

It should also be pointed out that, though the embodiment and drawings shown relate to a device 1 for wrapping packets 2 in sheets 3 of heat-seal material, the teachings of the present invention also apply to stabilizing sheets 3 of paper material applied with heat-setting and/or hot-melt adhesive.

Though the above description and attached drawings relate to stabilizing a conventional hinged-lid packet 2 of cigarettes, the teachings of the present invention obviously also apply to any type of packet, such as a "soft" packet of cigarettes.

Moreover, in alternative embodiments not shown, some longitudinal and/or transverse edges of packet 2 may be non-square rounded or bevelled edges. For example, the longitudinal edges may be non-square rounded or bevelled edges, or (as in the packet of cigarettes described in Patent Application EP-A1-0764595), the major transverse edges may be non-square rounded or bevelled edges; or some longitudinal and transverse edges may be non-square edges, so as to have both non-square rounded or bevelled longitudinal and transverse edges.

In a different embodiment not shown, packet 2 may resemble the packet of cigarettes described in Patent Application EP-A1-1066206; in which case, each major lateral wall is outwardly convex, and comprises a flat central portion and two curved, creased lateral bands.

The teachings of the present invention obviously also apply to the manufacture of cartons of cigarettes, and to packages of other than cigarettes, such as food products, confectionary, or toiletries.

The invention claimed is:

1. A method of wrapping articles, comprising the steps of:
    folding a sheet (3) of wrapping material about a respective article (2) to form a wrapping (9) having at least two superimposed portions (10, 11);
    conveying the wrapping (9) in a first direction (A) along a first path (P1);
    joining said two superimposed portions (10, 11) by transferring heat to the two superimposed portions (10, 11) by means of at least one heating head (14), which is fed in the first direction (A), in phase and in contact with the wrapping (9), from a contact station (22) to a withdrawal station (23), along a second path (P2) extending parallel to at least a portion of the first path (P1);
    moving the heating head (14) crosswise to said first path (P1) and said second path (P2), so that the heating head (14) approaches the wrapping (9) and is brought into contact with the superimposed portions (10, 11) at the contact station (22);
    moving the heating head (14) crosswise to said first path (P1) and said second path (P2), so that the heating head (14) is withdrawn from the wrapping (9) at the withdrawal station (23); and
    conveying the heating head (14) from the withdrawal station (23) to the contact station (22) along said second path (P2) in a second direction (B) opposite the first direction (A); said heating head (14) being conveyed from the contact station (22) to the withdrawal station (23) at a first speed (V1);
    the heating head (14) being conveyed from the withdrawal station (23) to the contact station (22) at a second speed (V2) greater than or equal to the first speed (V1);
    wherein a given number of heating heads (14) are conveyed together, along said second path (P2); said first speed (V1) and said second speed (V2) being related by the following equation:

$$V2 \geq (n-m) \times V1$$

where V1 is the first speed (V1), V2 is the second speed (V2), n is the given number of heating heads (14), and m is a integer smaller than n; the given number of heating heads (14) being greater than one.

2. A method as claimed in claim 1, wherein m equals one.

3. A method as claimed in claim 1, wherein n equals six, and m equals four.

4. A method as claimed in claim 3, wherein said first speed (V1) and said second speed (V2) are related by the following equation:

$$V2 \cong 2 \times V1.$$

5. A method as claimed in claim 1, wherein said wrapping (9) is fed in steps along the first path (P1).

6. A method as claimed in claim 1, wherein said heating head (14) is conveyed continuously from the withdrawal station (23) to the contact station (22).

7. A method as claimed in claim 1, wherein at least two heating heads (14) are conveyed together, along said second path (P2); the heating heads (14) being arranged in a line, so as to comprise a leading heating head (14') and a trailing heating head (14"); each heating head (14) being conveyed between a respective contact station (22) and a respective withdrawal station (23); and the contact station (22') of the leading heating head (14') substantially coinciding with the withdrawal station (23") of the trailing heating head (14"), or being located downstream from the withdrawal station (23") of the trailing heating head (14").

8. A method as claimed in claim 1, wherein the first path (P1) and the second path (P2) each define a respective arc of a respective circumference; the circumferences being coaxial.

9. A method as claimed in claim 8, wherein, during the steps of moving the heating head (14) crosswise to the first path (P1) and the second path (P2), the heating head (14) is moved radially with respect to said circumferences.

10. A method as claimed in claim 1, wherein said heating head (14) is conveyed from the contact station (22) to the withdrawal station (23) at a first speed (V1); the heating head (14) being conveyed from the withdrawal station (23) to the contact station (22) at a second speed (V2) greater than the first speed (V1).

11. A device for wrapping articles, the device (1) comprising;
a folding unit (8) for folding a sheet (3) of wrapping material about a respective article (2) to form a wrapping (9) having at least two superimposed portions (10, 11);
a first conveyor (5) for conveying the wrapping (9) in a first direction (A) along a first path (P1);
at least one heating head (14) for joining said two superimposed portions (10, 11) by transferring heat to the two superimposed portions (10, 11);
a second conveyor (13) for conveying the heating head (14) in the first direction (A), in phase and in contact with the wrapping (9), from a contact station (22) to a withdrawal station (23), along a second path (P2) extending parallel to at least a portion of the first path (P1);
at least one actuator (21) for moving the heating head (14) crosswise to said first path (P1) and said second path (P2), so that the heating head (14) approaches the wrapping (9) and is brought into contact with the wrapping (9) at the contact station (22), and is withdrawn from the wrapping (9) at the withdrawal station (23);
the second conveyor (13) conveying the heating head (14) from the withdrawal station (23) to the contact station (22) along said second path (P2) in a second direction (B) opposite the first direction (A); the second conveyor (13) conveying the heating head (14) from the contact station (22) to the withdrawal station (23) at a first speed (V1), and from the withdrawal station (23) to the contact station (22) at a second speed (V2) greater than or equal to the first speed (V1);
the device further comprising a given number of heating heads (14), which are connected to one another to move together, along said second path (P2), and are each brought into contact with a respective said wrapping (9); the first and second speed (V1, V2) being related by the following equation:

$$V2 \geq (n-m) \times V1$$

where V1 is the first speed (V1), V2 is the second speed (V2), n is the given number of heating heads (14), and m is a integer smaller than n; the given number of heating heads (14) being greater than one.

12. A device as claimed in claim 11, wherein m equals one.

13. A device as claimed in claim 11, wherein said first conveyor (5) conveys said wrapping (9) in steps.

14. A device as claimed in claim 11, wherein the second conveyor (13) conveys the heating head (14) continuously from the withdrawal station (23) to the contact station (22).

15. A device as claimed in claim 11, and comprising at least two heating heads (14), which are connected to each other to move together, along said second path (P2); the heating heads (14) being arranged in a line, so as to comprise a leading heating head (14') and a trailing heating head (14"); the second conveyor (13) conveying each heating head (14) between a respective contact station (22) and a respective withdrawal station (23); and the contact station (22') of the leading heating head (14') substantially coinciding with the withdrawal station (23") of the trailing heating head, or being located downstream from the withdrawal station (23") of the trailing heating head (14").

16. A device as claimed in claim 11, wherein the first conveyor (5) comprises a first wheel (15) rotating about a respective axis (16) and comprising at least one seat (17) for housing said sheet (3) of wrapping material and said respective article (2); the second conveyor (13) comprising a second wheel (20) rotating about said axis (16).

17. A device as claimed in claim 16, wherein the first and second wheels (15, 20) are designed so that said second path (P2) and said axis (16) are located on opposite sides of the first path (P1).

18. A device as claimed in claim 16, wherein said actuator (21) moves the heating head (14) radially with respect to said axis (16).

19. A device as claimed in claim 11, wherein n equals six, and m equals four.

20. A device as claimed in claim 19, wherein said first speed and said second speed are related by the following equation:

$$V2 \geq 2 \times V1.$$

21. A method of wrapping articles, comprising the steps of:
folding a sheet of wrapping material about respective articles to form wrappings having, each, at least two respective superimposed portions;
conveying the wrappings in a first direction along a first path;
joining said two superimposed portions by transferring heat to the two superimposed portions by means of at least two heating heads, which are fed, each, in the first direction, in phase and in contact with a respective wrapping, from a respective contact station to a respective withdrawal station, along a second path extending parallel to at least a portion of the first path;
the heating heads being arranged in a line, so as to comprise a leading heating head and a trailing heating head;
the contact station of the leading heating head substantially coinciding with the withdrawal station of the trailing heating head, or being located downstream from the withdrawal station of the trailing heating head;
moving the heating heads crosswise to said first path and said second path, so that the heating heads approach the respective wrappings and are brought into contact with the superimposed portions at the contact stations;

moving the heating heads crosswise to said first path and said second path, so that the heating heads are withdrawn from the respective wrappings at the respective withdrawal stations;

conveying the heating heads from the withdrawal stations to the contact stations along said second path in a second direction opposite the first direction;

said heating heads being conveyed from the contact stations to the withdrawal station at a first speed; and the heating heads being conveyed from the withdrawal stations to the contact stations at a second speed greater than or equal to the first speed.

22. A device for wrapping articles, the device comprising a folding unit for folding a sheet of wrapping material about respective articles to form wrappings having, each, at least two respective superimposed portions;

a first conveyor for conveying the wrappings in a first direction along a first path;

at least two heating heads for joining said superimposed portions by transferring heat to the superimposed portions;

the two heating heads are connected to each other to move together along said second path;

the heating heads being arranged in a line, so as to comprise a leading heating head and a trailing heating head;

a second conveyor for conveying each heating head in the first direction, in phase and in contact with the respective wrapping, from a respective contact station to a respective withdrawal station, along a second path extending parallel to at least a portion of the first path;

the contact station of the leading heating head substantially coinciding with the withdrawal station of the trailing heating head, or being located downstream from the withdrawal station of the trailing heating head;

at least one actuator for moving the heating heads crosswise to said first path and said second path, so that each heating head approaches the respective wrapping and is brought into contact with the respective wrapping at the respective contact station, and is withdrawn from the respective wrapping at the respective withdrawal station;

the second conveyor conveying the heating heads from the withdrawal stations to the contact stations along said second path in a second direction opposite the first direction; and the second conveyor conveying the heating heads from the contact stations to the withdrawal stations at a first speed, and from the withdrawal stations to the contact stations at a second speed greater than or equal to the first speed.

* * * * *